June 22, 1954     H. E. WUNDERLICH     2,681,608
SUCTION VENTILATOR FOR AUTOMOBILES
Filed May 5, 1951     2 Sheets-Sheet 1
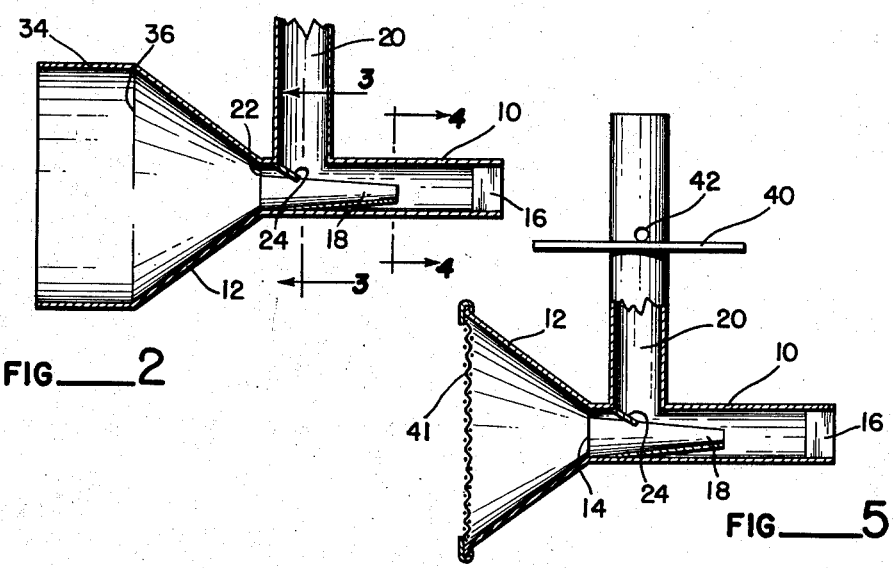
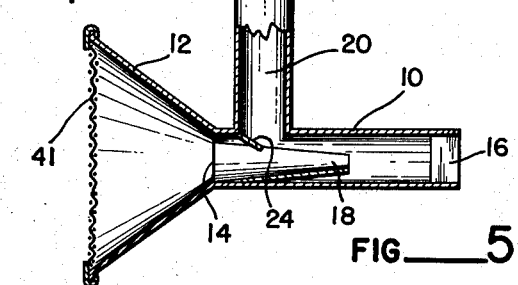
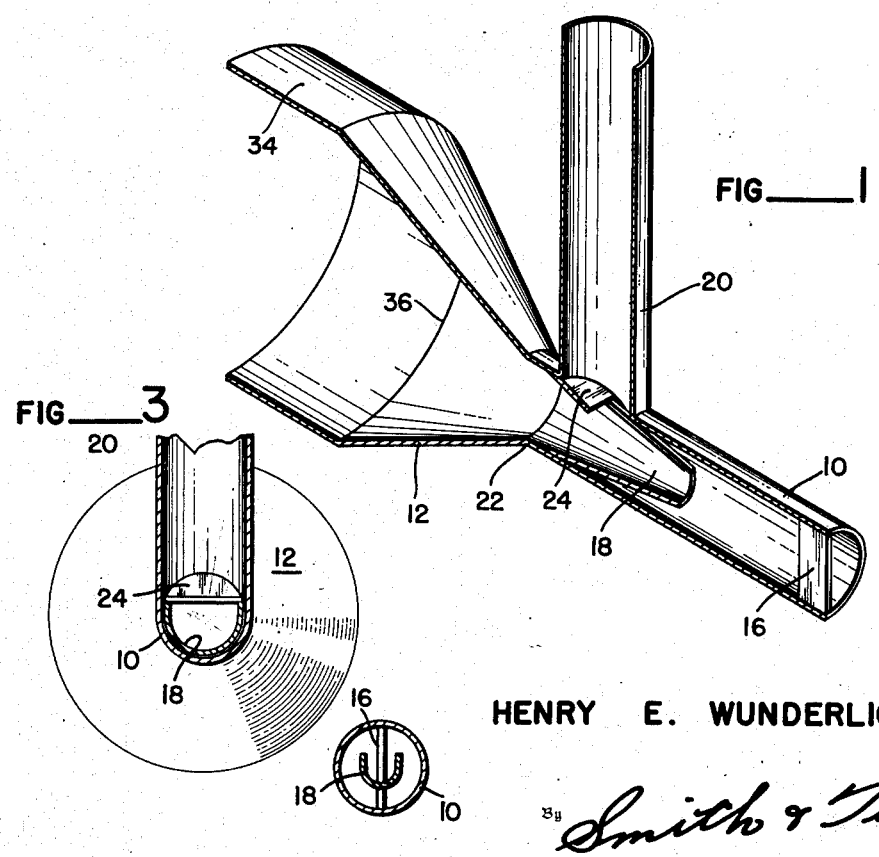
HENRY E. WUNDERLICH
Inventor
By Smith & Tuck
Attorneys

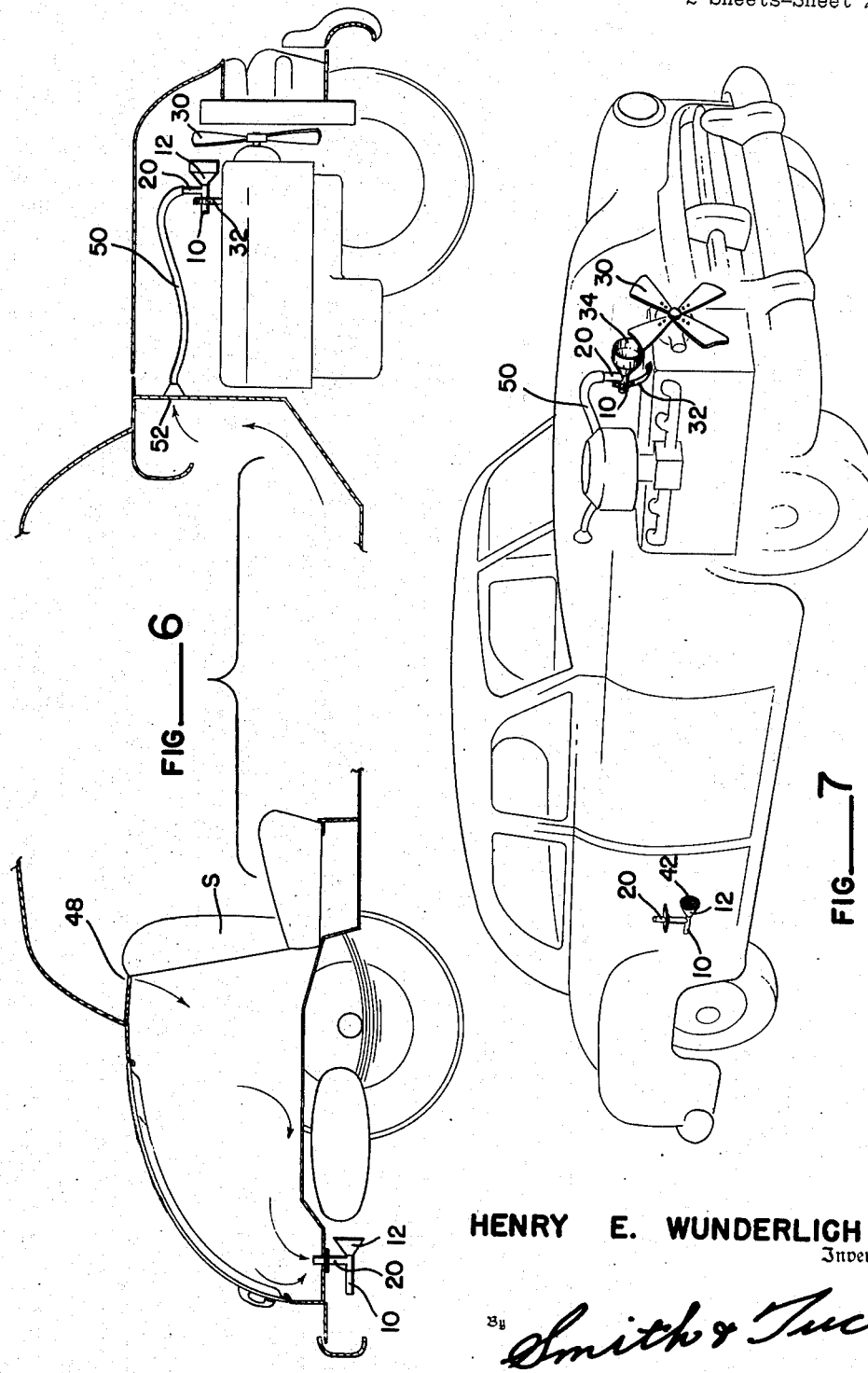

Patented June 22, 1954

2,681,608

UNITED STATES PATENT OFFICE 2,681,608

SUCTION VENTILATOR FOR AUTOMOBILES

Henry E. Wunderlich, Seattle, Wash.

Application May 5, 1951, Serial No. 224,692

3 Claims. (Cl. 98—2)

This present invention relates to a ventilating means for automobile bodies especially of the closed car type which is constructed so as to produce a suction of the exhaust tube by means of the Venturi or siphoning action caused by a moving stream of air. For ventilating certain parts of the car, the movement of the car itself creates this air stream and further the same suction device can obtain an air stream of adequate velocity to cause it to function properly by mounting the air-receiving opening within the slip stream of the cooling fan. A funnel-like air-receiving portion of the device is employed so as to get the maximum advantage of the nozzle effect to the end that a large amount of air can be passed through a comparatively small axial opening in a funnel-like collector and thus give the relatively high air velocities that are necessary to create adequate suction.

The ventilation of closed automobile bodies has long been a perplexing problem and many solutions have been attempted for it. In certain automobiles elaborate air conditioning arrangements have been provided and these generally function very satisfactorily. However they are expensive in the first place and to properly function are practically a factory built-in design. Other solutions of the problem have been met to a degree by the various forms of heaters which have an air intake normally behind the radiator grill or sometimes located behind the radiator itself and this arrangement with most heaters is employed to pass fresh air under some pressure into the car body with the same either being heated or not in accordance with the setting of the controls on the heater. Many cars are equipped further with cowl ventilators and lastly of course with the general type of window ventilators where a portion of the car windows is arranged on vertical pivots so that it can be inclined and thus create a suction, which, on one hand draws air out of the car, and replacement air flows in on the front surface of the ventilating pane. All such devices as observed function by introducing outside air into the air contained within the car body thus diluting any gases present. It is thus never possible to entirely purify the air within the car body. Further nearly all closed cars are provided with a luggage compartment in the rear of the body proper and these areas are known collectors of foul air. Further under certain conditions of relative humidity and temperature an ideal condition is created for the precipitation of the air-borne moisture. Ideal conditions are often created for the forming of a rain or fog even though on a small scale.

In my present arrangement I provide means for actually siphoning, or removing by suction the foul air from the inside of the car body and then depend for fresh air supply upon the inflow from the window openings or the standard window ventilating means. With such an arrangement the points where the suction hose terminates, or in other cases where the suction pipe terminates, can be selected as those points where the air is normally most foul and thus the contaminating elements are removed leaving the inflowing air in its natural pure state.

The principal object of my present invention therefore is to provide a ventilating device for closed automobile bodies so arranged as to produce a high degree of suction and then to have the final intake of the suction devices so that they can be positioned in the most appropriate places within the car body.

A further object of my present invention is to provide ventilating devices that are economically made and which are simple to install in existing automobiles.

A further object of my present invention is to provide ventilating means which takes its operating energy from either the movement of the car or which can obtain its energy from the air moved by the fan employed in the cooling system of the automobile.

A further object of my invention is to provide a suction device in which the driven air nozzle is especially arranged to provide a high degree of suction for the specific purpose of the device.

Further objects, advantages and capabilities will be apparent from the description and disclosure in the drawings, or may be comprehended or are inherent in the device.

In the drawings:

Figure 1 is a perspective view through my suction-creating device, the same being shown in sections as cut by a vertical plane through the longitudinal axis of the device;

Figure 2 is a side elevation of my device, in section;

Figure 3 is a transverse sectional view, taken along the line 3—3 of Figure 2;

Figure 4 is a transverse sectional view taken along the line 4—4 of Figure 2;

Figure 5 is a vertical sectional view showing the form of suction-creating device as thus modified for installation under the floor of the car;

Figure 6 is a bracketed fragmentary, vertical sectional view through an automobile body showing preferred locations of two of my suction-created devices and illustrating the flow of air thereto;

Figure 7 is a perspective view showing the installation of the two forms of my device with the essential parts of the automobile to which they are secured being shown in phantom view;

Referring more particularly to the disclosure in the drawings, the numeral 10 designates the main supporting or flow tube of my device. This flow tube is of uniform diameter throughout its length. At one end is positioned the collecting or forcing cone 12. This cone may be formed suitably as part of the closed tube. However, manufacturing expediencies indicate that it should be made as a separate item and joined to the tube as at 14. Normally I prefer that the forcing cone be a true cone and have a maximum diameter of approximately four times the diameter of tube 10. These proportions can naturally be varied but trial has proved that for the speed given air, as by a rapidly moving vehicle, if the conical wall is carried outward at an angle of about 35 degrees, with the axis of tube 10, to a point where the diameter of the outer rim of the cone is substantially four times that of the tube, it will attain about the maximum efficiency for the structure. At its opposite end, tube 10 is provided with an internal stabilizing fin 16. This is to counteract an observed phenomenon in that the air passing through the cone portion 12 and then meeting the discharge from tube 10 creates a swirling action within tube 10. This has been found to interfere with the suction producing action of jet tube 18 but this disturbing phenomenon can be satisfactorily reduced by the introduction of stabilizing fin 16.

The swirling in tube 10 means that the air is following partially a helical path of travel and the action of fin 16 may be explained by the fact that this member creates a broad baffle directly in said helical path of travel.

For the specific use for which this device is intended it has been found expedient to depart from the usual form of jet and in the showing of Figures 1 through 5 it is to be noted that jet 18 is in effect U-shaped after the showing especially of Figures 3 and 4. In general jet 18 is tapering along its longitudinal axis and is joined to tube 10 by feathering the edge thereof and then securing the same thereto generally along the line 22. It is desirable to provide a partial closure of the open upper side of jet 18 by baffle 24 which is secured within tube 10 in such a position as also to constrict the lower end of suction tube 20. In the proportions shown throughout my drawings the plane of baffle 24 makes an angle of approximately 30 degrees with the longitudinal axis of tube 10. The exact angle of this baffle however is subject to the flow characteristics of the unit and may of necessity vary from five degrees less to ten degrees greater than the amount given. In addition to forming a partial closure for the upper open side of jet 18 the baffle definitely directs the air coming into suction tube 20 into the direction to which it must change in order to pass out through tube 10.

Referring to Figures 6 and 7 it is to be noted that the position in which my device is employed determines some of its characteristics. The unit which is to be installed immediately behind the radiator fan 30 can best be supported by a bracket member 32 which encircles tube 10 and is in turn secured under some convenient nut occurring on the motor block, as, for instance, one of the cylinder head stud nuts. Further in this position it has been found desirable to employ a cylindrical skirting as 34 secured around the large end of cone 12. This skirting can thus be formed as a portion of a cylinder and secured to the forcing cone by welding or otherwise at seam 36. The purpose of this cone is to take fullest advantage of the inertia implanted in the air by fan 30 and to cause the air to be carried down through the forcing cone instead of spilling over the sides thereof. This divergence has been found necessary for this purpose due to the high degree of constriction in the jet portion of the device, particularly when the air coming in is under the urgence of the movement of the car in addition to the impact of the cooling fan 30. Here again features of design must be taken in account but the forms shown make it impossible to employ the same general design proportionately in both forms of my present device. For placement behind the fan there is no need for a screen on the device. The radiator itself and any screens that protect it from insects and the like are adequate.

For a ventilation of the floor area of the car and particularly the back trunk area I have found it desirable to provide the suction tube 20 with a flange 40 which may be suitably pierced with holes through fastening or bolting the device to the floor of the car. The suction tube should extend well above flange 40 to avoid being covered by articles carried in the car. It is to be noted that this form of such device has only the movement of the car as an impelling force to create the draft through the device. Consequently it has been found that the skirting 34 is unnecessary but that a screen covering 41 is essential. It follows therefore that with the screen 41 the skirting would only tend to hold rocks and other debris that might be picked up by the device and which without the skirting would no doubt roll of the edge of the screen. Drain openings 42 should be positioned at the level of the top of the car floors.

In using my system of car ventilation it is necessary to determine where the heaviest concentration of objectionable gases occur in the car. The car exhaust contains the by-products of combustion of not only the hydro-carbon fuel used but also of a certain amount of lubricating oil and the like. Actually the bulk of the exhaust gas is normally the inert gas nitrogen in the proportion of approximately 75% by either weight or volume. Nitrogen is not harmful but it can cause suffocation through denying the occupants of the car sufficient oxygen. Carbon dioxide is a very substantial part of the exhaust fumes and is approximately one and a half times heavier than the air. Consequently it will stratify and tend to fill the lower portions of the car body. It is not toxic in itself except that it will produce gradual suffocation by means of denying the occupant a full amount of oxygen. The remaining gas in the exhauts that occurs in any appreciable quantity is carbon monoxide, which is a very dangerous and toxic gas. Carbon monoxide has very nearly the same specific gravity as air, consequently the nitrogen and carbon monoxide will mix freely with the air without any tendency to stratification despite the slight amount of agitation always present. Based upon this premise it becomes apparent that means should be provided on the floor of the car for the discharge of the heavy gases such as carbon dioxide. This I achieve by means of the devices as shown in Figure 5 which normally are placed under the car floor in those positions where they can be installed without interference with the general use of the car. Aside from the positions shown, a favorable position also is under the foot rail immediately behind the front seat of the car. There generally is a high percentage of water vapor present in exhaust gases. This tends to precipitate on cooling and make the floor position for such devices very desirable. It is well proved however that the dangerous level for air is that at face level for the individual seated in the car. Consequently means should be provided for the removal of air at this level if possible. In Figure 6 it is to be noted that the rear compartment suction device is drawing air through an opening immediately behind the top back portion of the seat S as indicated at 48. This is an optimum position for the removal of gas. In the front seat area the most practical place to remove gas is as high up under the cowl as possible. In Figures 6 and 7 it is to be noted that attached to the device of Figures 1 and 2, is a length of suction hose 50 terminating in a suction grill at 52. This generally provides the most satisfactory arrangement for the average car.

It is to be noted that my device only removes gas or air from the car and does not supply any fresh air to the car. Consequently it is desirable that the windows be slightly lowered, or, in those cars provided with the same, which is quite general today, the rear and front seat ventilating portions of the side windows be opened slightly. These will usually provide for adequate inflow of fresh air and the inflow will be at the optimum level namely the level of the passengers' faces.

It is believed that it will be clearly apparent from the above description and the disclosure in the drawings that the invention comprehends a novel construction of a suction ventilator for automobiles.

I claim:

1. A high-velocity suction ventilating device, adapted for use in automobiles, comprising: a cylindrical flow tube and an air collecting cone having its small end secured to one end of said flow tube and axially aligned therewith, said air collecting cone having a conical inner surface and having an opening at its apex communicating with said flow tube whereby an air flowing into said cone will flow through said flow tube, the diameter of the outer end of said cone being at least four times the diameter of said flow tube; a cylindrical suction tube joining said flow tube at right angles adjacent said small end of said cone and said flow tube having an opening aligned with said suction tube providing fluid communication between said tubes; a plate-like stabilizing fin positioned in the other end of said flow tube and lying in a plane passing through the longitudinal axis of said flow tube; a jet member positioned in said flow tube forming a trough open toward said suction tube, said jet member being spaced a short distance from the wall of said flow tube opposite said suction tube except at the end of said jet member toward said cone where it joins said wall, said jet member tapering longitudinally as it extends away from said cone; a baffle extending inwardly from the wall of said flow tube between said suction tube and said cone and forming a small angle with the longitudinal axis of said flow tube and disposed to partially block flow of air directly from said suction tube to said jet member.

2. A high velocity suction ventilating device, adapted for use in automobiles, comprising: a cylindrical flow tube and an air collecting cone having its small end secured to one end of said flow tube and axially aligned therewith, said air collecting cone having a conical inner surface and having an opening at its apex communicating with said flow tube whereby air flowing into said cone will flow through said flow tube; a cylindrical suction tube joining said flow tube at right angles adjacent said small end of said cone and said flow tube having an opening aligned with said suction tube providing fluid communication between said tubes; a jet member positioned in said flow tube forming a trough open toward said suction tube, said trough being spaced a short distance from the wall of said flow tube opposite said suction tube except at the end of said jet member toward said cone where it joins said wall, said jet member tapering longitudinally as it extends away from said cone; a baffle extending inwardly from the wall of said flow tube between said suction tube and said cone and forming a small angle with the longitudinal axis of said flow tube and disposed to partially block flow of air directly from said suction tube to said jet member.

3. A high velocity suction ventilating device, adapted for use in automobiles, comprising: a cylindrical flow tube and an air collecting cone having its small end secured to one end of said flow tube and axially aligned therewith, said air collecting cone having a conical inner surface and having an opening at its apex communicating with said flow tube whereby air flowing into said cone will flow through said flow tube, the diameter of the outer end of said cone being at least four times the diameter of said flow tube; a suction tube joining said flow tube at right angles adjacent said small end of said cone and said flow tube having an opening aligned with said suction tube providing fluid communication between said tubes; a jet member positioned in said flow tube forming a trough open toward said suction tube, said trough being spaced a short distance from the wall of said flow tube opposite said suction tube except at the end of said jet member toward said cone where it joins said wall, said jet member tapering longitudinally as it extends away from said cone; a baffle extending inwardly from the wall of said flow tube between said suction tube and said cone and forming a small angle with the longitudinal axis of said flow tube and disposed to partially block flow of air directly from said suction tube to said jet member.

References Cited in the file of this patent

UNITED STATES PATENTS

| Number | Name | Date |
|---|---|---|
| 762,524 | Harrison | June 14, 1904 |
| 1,612,951 | Spangler | Jan. 4, 1927 |
| 1,758,573 | Lucke | May 13, 1930 |
| 1,783,674 | Rehwold et al. | Dec. 2, 1930 |
| 1,943,187 | Re Vley et al. | Jan. 9, 1934 |

FOREIGN PATENTS

| Number | Country | Date |
|---|---|---|
| 243,365 | Great Britain | Nov. 19, 1925 |
| 476,787 | Great Britain | Dec. 15, 1937 |
| 563,254 | Great Britain | Aug. 4, 1944 |
| 852,716 | France | Nov. 9, 1939 |